United States Patent
Zartman et al.

(10) Patent No.: US 10,772,285 B2
(45) Date of Patent: Sep. 15, 2020

(54) INTEGRALLY MANUFACTURED STALL DIVIDERS FOR BARNS

(71) Applicants: Thomas L. Zartman, Ephrata, PA (US); Thomas L. Zartman, Jr., Ephrata, PA (US)

(72) Inventors: Thomas L. Zartman, Ephrata, PA (US); Thomas L. Zartman, Jr., Ephrata, PA (US)

( * ) Notice: Subject to any disclaimer, the term of this patent is extended or adjusted under 35 U.S.C. 154(b) by 155 days.

(21) Appl. No.: 15/855,633

(22) Filed: Dec. 27, 2017

(65) Prior Publication Data

US 2018/0184613 A1   Jul. 5, 2018

Related U.S. Application Data

(63) Continuation-in-part of application No. 15/614,829, filed on Jun. 6, 2017, now Pat. No. 10,645,900.

(60) Provisional application No. 62/442,569, filed on Jan. 5, 2017, provisional application No. 62/350,857, filed on Jun. 16, 2016.

(51) Int. Cl.
| | |
|---|---|
| *A01K 1/00* | (2006.01) |
| *B29C 53/08* | (2006.01) |
| *B29L 31/00* | (2006.01) |
| *B29K 23/00* | (2006.01) |
| *B29L 23/00* | (2006.01) |

(52) U.S. Cl.
CPC .......... *A01K 1/0011* (2013.01); *B29C 53/083* (2013.01); *B29K 2023/065* (2013.01); *B29K 2023/0641* (2013.01); *B29L 2023/22* (2013.01); *B29L 2031/73* (2013.01)

(58) Field of Classification Search
CPC .. A01K 1/0029; A01K 1/0088; A01K 1/0011; A01K 1/005; A01K 1/06; A01K 1/0017; Y10T 403/5753; Y10T 403/453; Y10T 403/451; Y10T 403/45
USPC .......... 119/516, 520, 522, 523, 521
See application file for complete search history.

(56) References Cited

U.S. PATENT DOCUMENTS

| | | | | |
|---|---|---|---|---|
| 4,386,870 A | * | 6/1983 | Baroody | .......... F16B 7/18 403/234 |
| 5,797,613 A | * | 8/1998 | Busby | .......... B62K 25/04 280/284 |
| 5,975,026 A | * | 11/1999 | Rudolph | .......... A01K 1/0011 119/523 |
| 6,318,297 B1 | * | 11/2001 | Hatfield | .......... A01K 1/0011 119/516 |

(Continued)

*Primary Examiner* — Trinh T Nguyen
(74) *Attorney, Agent, or Firm* — Miller Law Group, PLLC

(57) ABSTRACT

A polymer stall divider for a barn will permit lateral flexing when a cow presses against the stall divider while the stall divider asserts a lateral force against the cow to urge the cow to move into a proper position between adjacent stall dividers without causing injury to the cow. The polymer stall divider can be formed of a polymer material clad onto the outer surface of a steel structural member and then bent into shape to form the desired configuration. The divider can be formed in sections with adjacent sections being connected by an internal connector formed of selected materials to provide the desired flexibility and durability characteristics. A mounting bracket formed of a pair of opposing clam shells can be utilized to secure the stall divider to the frame of the barn, thus providing an easily installed divider structure.

21 Claims, 10 Drawing Sheets

(56) References Cited

U.S. PATENT DOCUMENTS

| | | | | |
|---|---|---|---|---|
| 6,467,434 | B1* | 10/2002 | Dejonge | A01K 1/0011 119/516 |
| 2005/0263092 | A1* | 12/2005 | Moreau | A01K 1/0011 119/516 |
| 2007/0006817 | A1* | 1/2007 | Komro | A01K 1/0011 119/523 |
| 2012/0234257 | A1* | 9/2012 | Wollesen | A01K 1/0011 119/523 |
| 2014/0109840 | A1* | 4/2014 | Wilson | A01K 1/0011 119/523 |
| 2015/0164037 | A1 | 6/2015 | Earle | |
| 2017/0280670 | A1* | 10/2017 | Johanningmeier | A01K 1/0005 |
| 2018/0184613 | A1* | 7/2018 | Zartman | A01K 1/0011 |

* cited by examiner

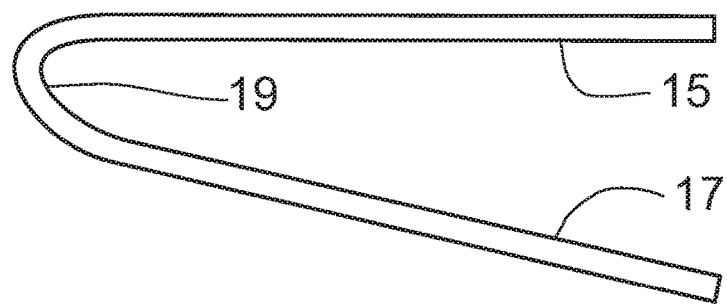
Fig. 4
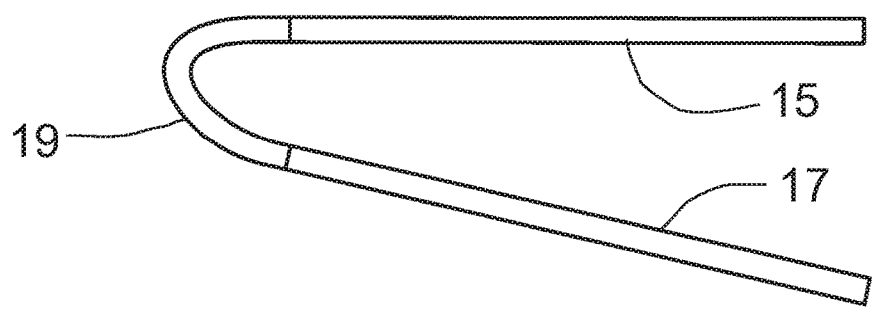
Fig. 5
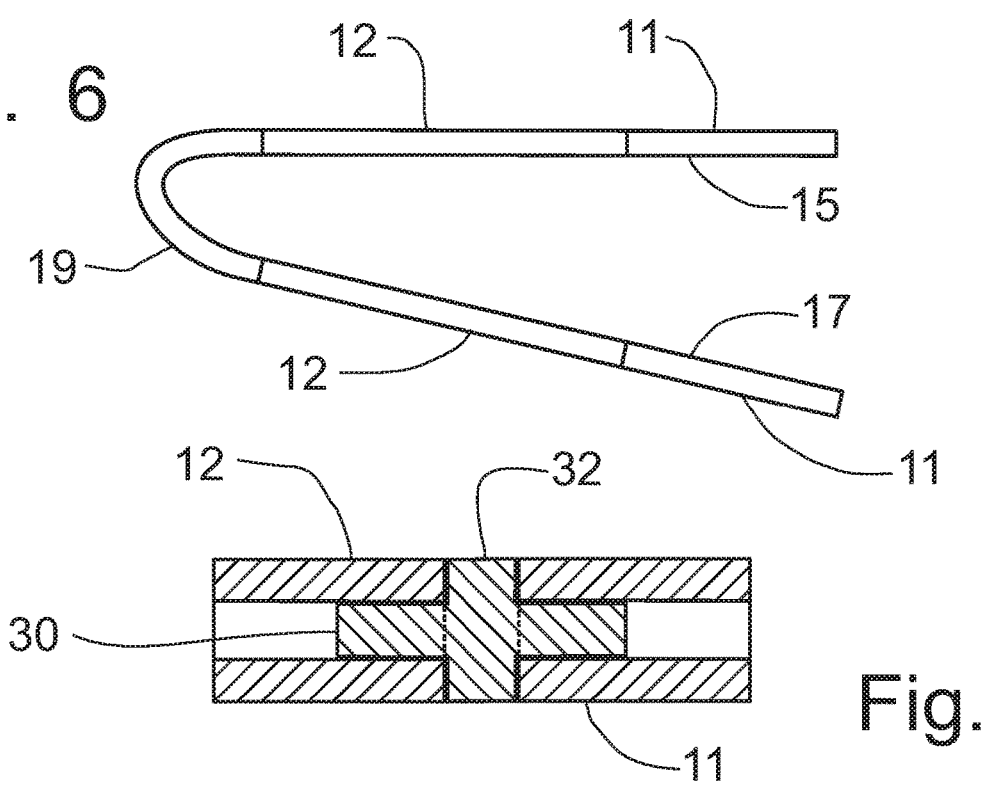
Fig. 6
Fig. 7

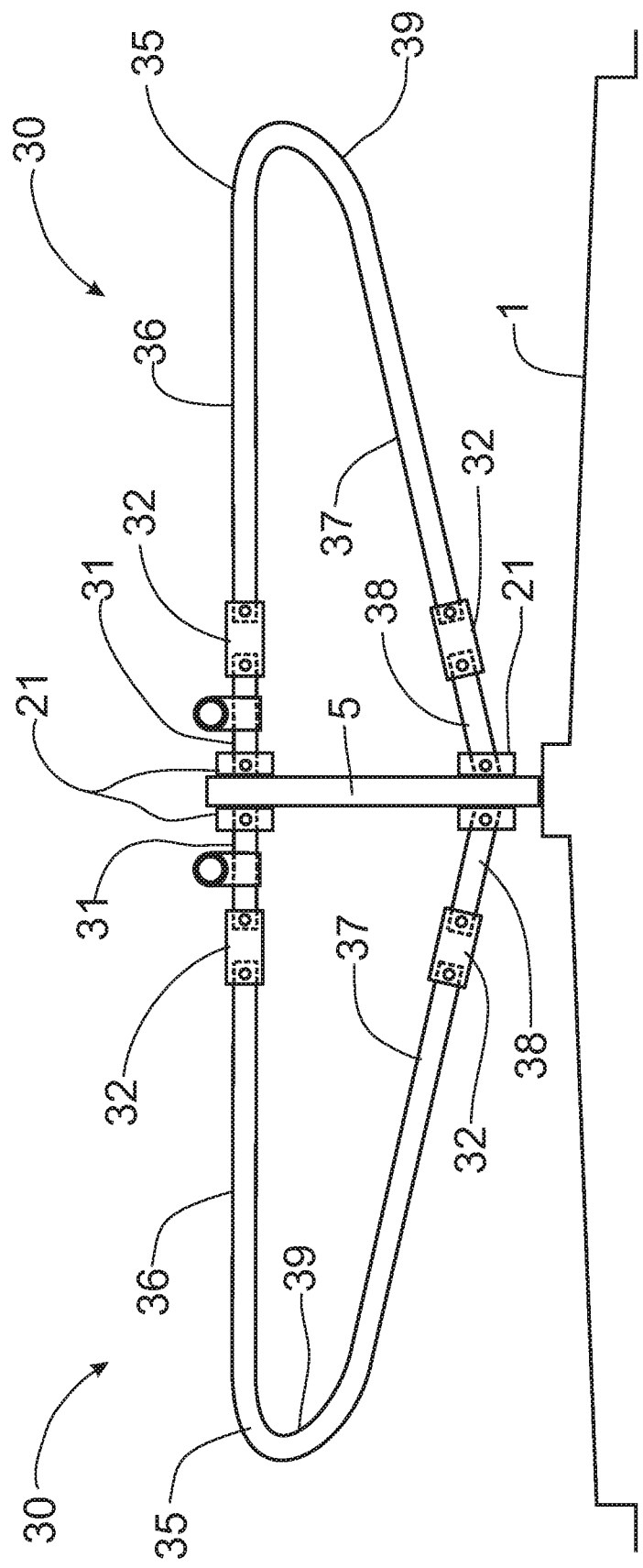

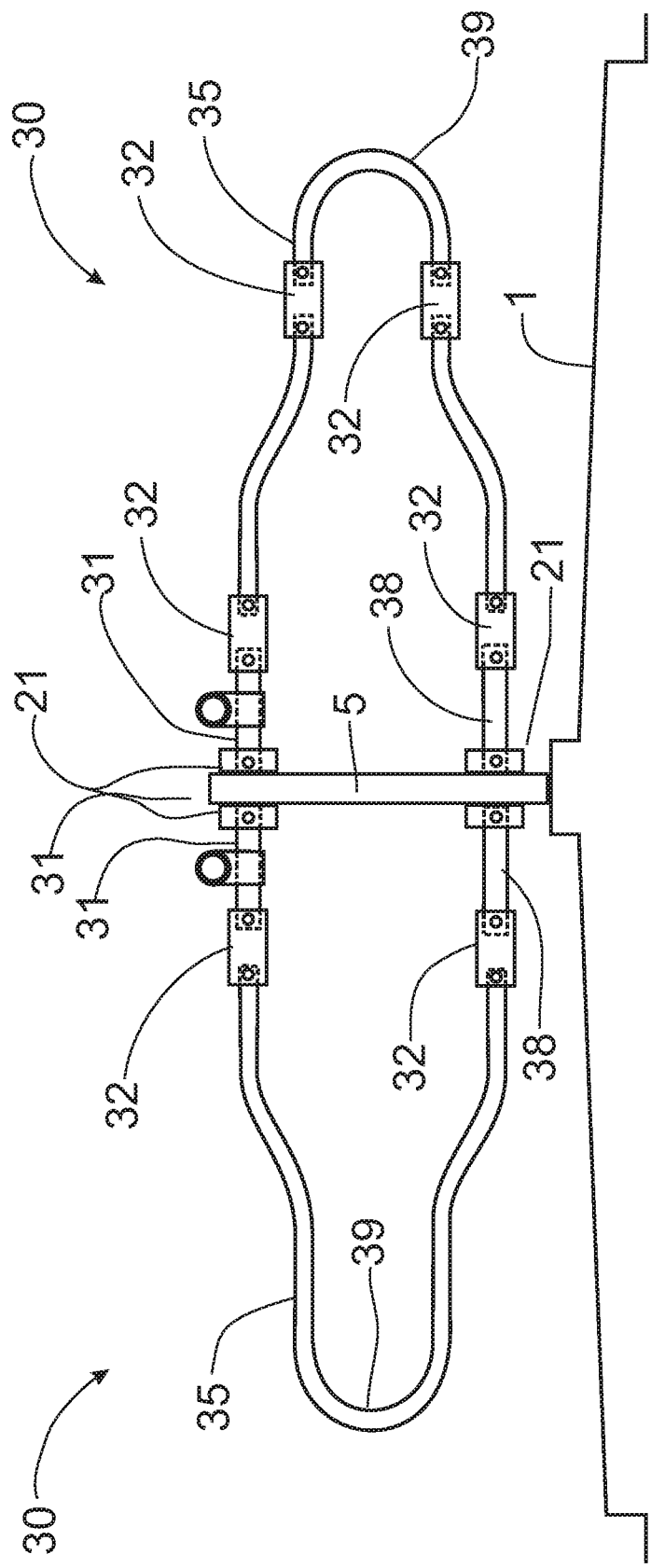

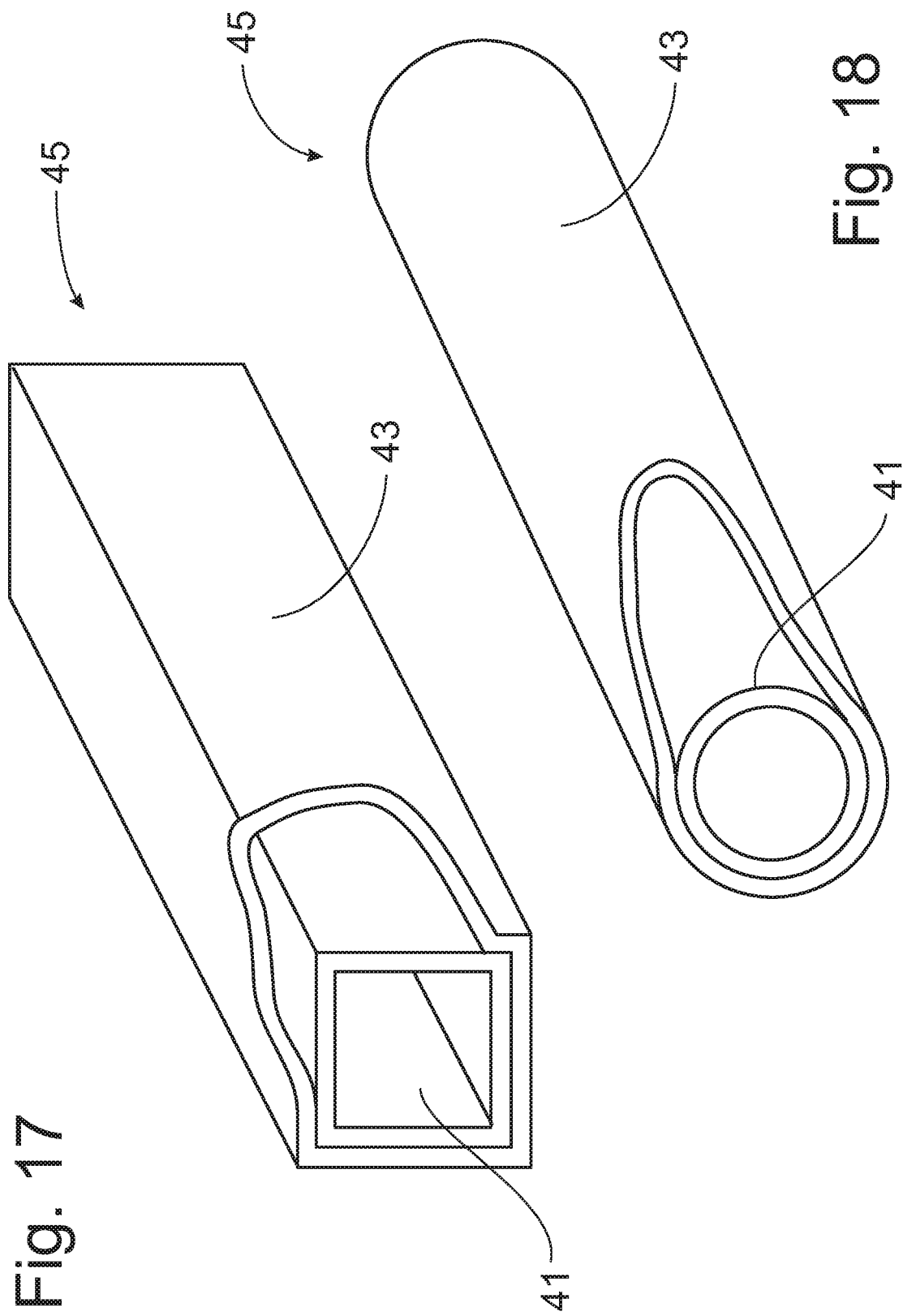

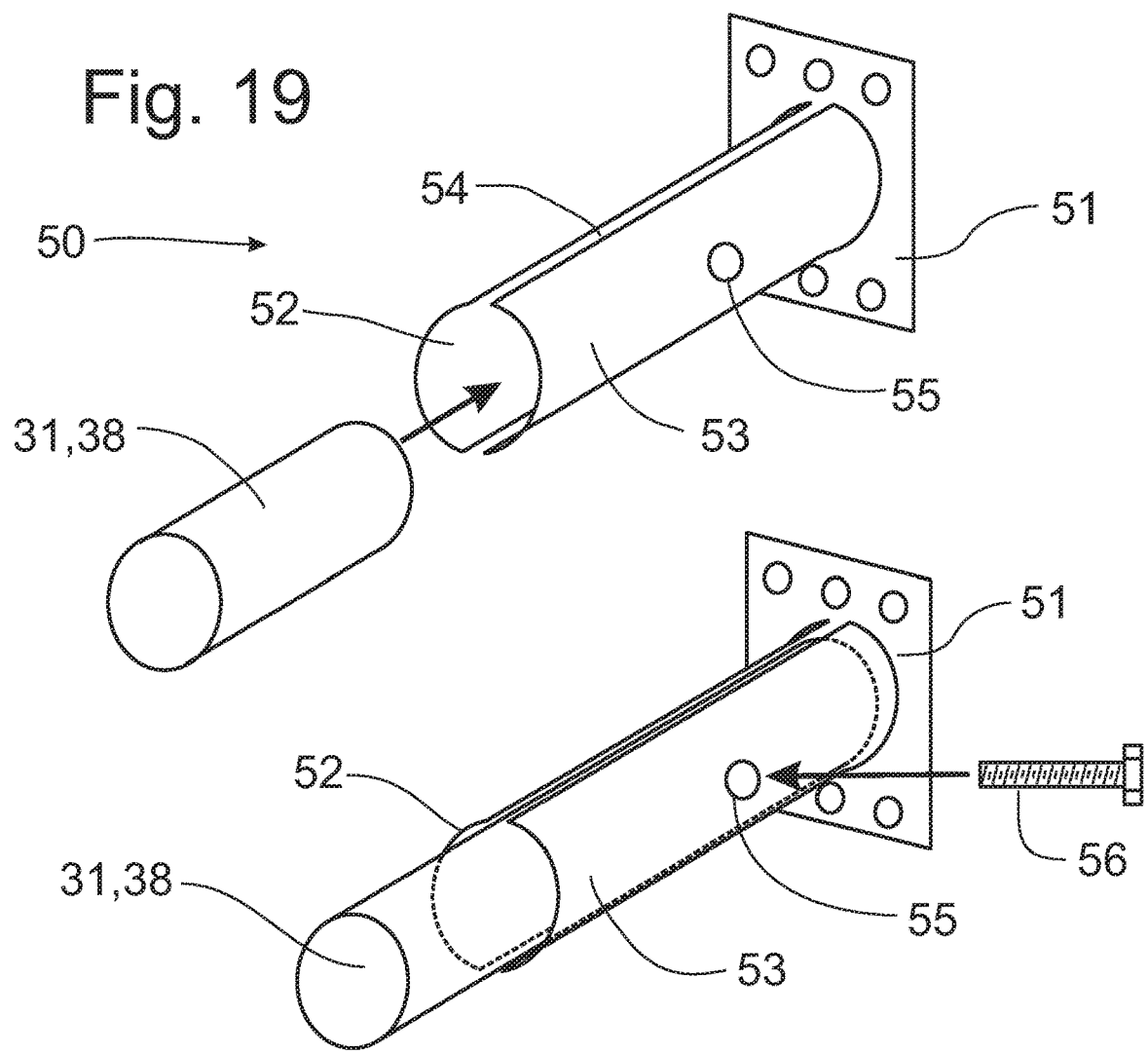
Fig. 19
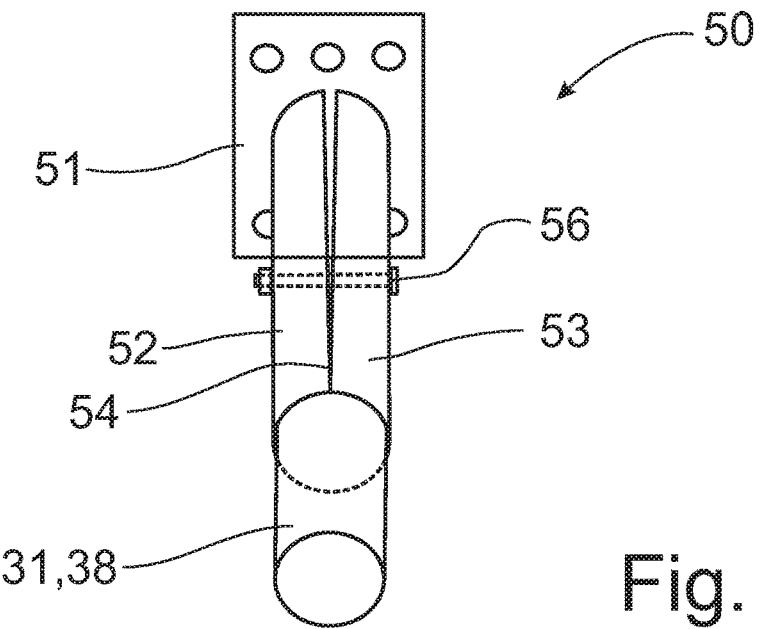
Fig. 20
Fig. 21

INTEGRALLY MANUFACTURED STALL DIVIDERS FOR BARNS

CROSS-REFERENCE TO RELATED APPLICATIONS

This application claims domestic priority on U.S. Provisional Patent Application Ser. No. 62/442,569, filed on Jan. 5, 2017, and entitled "Integrally Manufactured Stall Dividers for Barns"; and is a Continuation in Part of U.S. patent application Ser. No. 15/614,829, filed on Jun. 6, 2017, and entitled "Integrally Manufactured Stall Dividers for Barns", which claims domestic priority on U.S. Provisional Patent Application Ser. No. 62/350,857, filed on Jun. 16, 2016, and entitled "Integrally Manufactured Stall Dividers for Barns", the contents of which are incorporated herein by reference.

FIELD OF THE INVENTION

This invention relates generally to stall dividers for use in a barn to separate animals, and more particularly, to a polymer stall divider with internal connectors for separating dairy cattle in a barn.

BACKGROUND OF THE INVENTION

Conventional stall dividers are formed from metal, usually steel, and are positioned between animals, particularly dairy cows, to encourage the cows to lie down and rest without hurting themselves or the neighboring animals. Stall dividers are placed at predetermined spaced intervals along a row to separate the resting cattle. In free stall situations, the cows are allowed to enter the divided area of the barn and select a stall in which the cows walk into the stall head first. In free stall systems, the cows are not tied to the stall structure and are generally able to move out of the stall, but the stall dividers encourage the cows to lie down and rest. Generally, cattle are placed in stalls that are immediately adjacent one another with the head of one cow being located proximate to the head of the corresponding cow in the adjacent row of stalls. In free stall systems, the cows are milked and fed at a separate location. With ventilation provided to the free stall area, the cows are comfortable and content.

A different situation is a tie stall system in which the cows are placed in their stalls and tied to a tie bar to keep the cows in their stalls. Typically, tie stall systems have a significant space between the rows of stalls into which feed is positioned in front of each cow. Usually, the cows are milked while present in the tie stall system, and sometimes released afterward to move to a pasture or another area of the barn, or at other times the cows are retained in the tie stall system and encouraged to lie down and rest. In either the free stall or tie stall systems, stall dividers are used to separate the cows from the neighboring cows.

Stall dividers can be shaped in many different forms to conform to the preferences of the owner of the cattle. Some of those different shapes are reflected in FIGS. 8-13 and in FIG. 4. Irrespective of whether the barn utilizes tie stalls or free stalls, the stalls have a divider between them to keep the cows separated, and to keep cool. The particular shapes of the dividers are a matter of choice.

In U.S. patent application Ser. No. 14/568,504, filed on Dec. 12, 2014, by Michael Earle and published as U. S. Patent Publication No. 2015/0164037 on Jun. 18, 2015, a different type of stall divider is disclosed. In this Earle patent application, the stall dividers are manufactured from two different materials, including two horizontally-extending, and converging linear members made from a plastic material, i.e. polypropylene random copolymer, which are connected by curved flexible member made from rubber and joined to the distal ends of the two horizontally-extending members to create the stall divider. The curved rubber end member in this Earle patent application is significantly more flexible than the polymer horizontally-extending members to minimize injury to the cows entering the stall, and perhaps impacting the stall dividers.

It would be desirable to provide a stall divider that does not require the utilization of a rubber curved end member, yet allows for flexibility in the stall divider to prevent cows from being injured when running into the stall divider.

SUMMARY OF THE INVENTION

It is an object of this invention to overcome the disadvantages of the prior art by forming stall dividers from hollow flexible polymer tubing.

It is another object of this invention to provide a flexible polymer stall divider that can flex laterally if the animal presses against the stall divider.

It is a feature of this invention that the ability for the stall divider to flex laterally minimizes injury to the cow pressing against the stall divider.

It is an advantage of this invention that the flexed polymer stall divider will assert a lateral force against the cow to urge the cow to move into a proper position between the stall dividers.

It is another advantage of this invention that the polymer stall divider will return to its original position after the cow has moved into a proper position between the adjacent stall dividers.

It is another feature of this invention that the polymer stall divider can be formed in a monolithic manner with the same polymer material and same density.

It is still another feature of this invention that multiple densities of the polymer material can be utilized at different locations of the stall divider.

It is another advantage of this invention that the medium density polymer material can provide both durability and flexibility when impacted by a cow.

It is still another advantage of this invention that high density polymer material can be used to enhance durability at the expense of flexibility in the stall divider.

It is yet another feature of this invention that the curved end member of the stall divider can be formed from a polymer material that has lower density that the remaining portions of the stall divider.

It is yet another advantage of this invention that the curved end member of the stall divider having a lower density than the remaining portions of the stall divider will have a greater degree of flexibility than the rest of the stall divider structure.

It is still another object of this invention that the polymer stall dividers can be manufactured by heating the polymer material until softened sufficiently to bend in a mold into the desired shape for the stall divider.

It is another feature of this invention that the base end of the stall divider can be formed of a high density polymer while the distal portion of the elongated members can be formed from a medium density polymer and then the curved end members can be formed from a low density version of the polymer material.

It is still another feature of this invention that different polymer materials can be utilized in the construction of a polymer stall divider to maximize the desirable properties of the stall divider so long as the respective sections of polymer material can be joined together in some manner to create an integral stall divider structure.

It is an object of this invention to provide a method of manufacturing polymer stall dividers, particularly when utilizing different densities or types of polymer material.

It is a feature of this invention that the respective sections of stall dividers are connected by inserting connector members into the adjoining hollow ends of the respective sections of polymer material and then joining the respective sections of polymer material to the connector member, such as by adhesives.

It is another advantage of this invention that the respective sections of polymer material can be plastic welded to create a line blank to be softened and formed into a mold.

It is still another feature of this invention that the formed line blank of polymer material formed of different densities or types of polymer material can then be heated until softened sufficiently to be bent into the desired shape within a pre-formed mold.

It is a further feature of this invention that the structural members can be manufactured in whole or in part from conventional steel, from flexible hollow polymer tubing, or from a clad material in which a plastic sleeve covers the structure of the steel inner member, with appropriate connectors being used between respective sections of the stall divider structural members.

It is a further object of this invention that a mounting bracket is provided to support the stall divider from the base member.

It is another feature of this invention that the mounting bracket is formed with two semi-circular clam shells that can be drawn together to clamp a stall divider structural member therebetween.

It is a further advantage of this invention that the mounting bracket can be secured on any known base configuration to secure the stall divider to the framework of the barn.

It is an object of this invention to provide connector members for insertion into stall divider structural members for connecting sections of the formed structural members to provide a stall divider that will provide the desired operative functions.

It is a further object of this invention to provide a polymer stall divider, which is durable in construction, inexpensive of manufacture, carefree of maintenance, facile in assemblage, and simple and effective in use.

These and other objects, features and advantages are accomplished according to the instant invention by providing a polymer stall divider for a barn that will permit lateral flexing when a cow presses against the stall divider while the stall divider asserts a lateral force against the cow to urge the cow to move into a proper position between adjacent stall dividers without causing injury to the cow. The polymer stall divider can be formed of a polymer material clad onto the outer surface of a steel structural member and then bent into shape to form the desired configuration. The divider can be formed in sections with adjacent sections being connected by an internal connector formed of selected materials to provide the desired flexibility and durability characteristics. A mounting bracket formed of a pair of opposing clamshells can be utilized to secure the stall divider to the frame of the barn, thus providing an easily installed divider structure.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a side elevational view of a first embodiment of the stall divider incorporating the principles of the instant invention;

FIG. 5 is a side elevational view of a second embodiment of the stall divider;

FIG. 6 is a side elevational view of a third embodiment of the instant invention;

FIG. 7 is an enlarged diagrammatic cross-sectional view of an optional connector that can be utilized in the second and third embodiments of the instant invention as depicted in FIGS. 5 and 6;

FIG. 15 is a schematic representation of an alternative stall divider construction is a first configuration;

FIG. 16 is a second configuration of the alternative stall divider construction shown in FIG. 15;

FIG. 16A is a schematic elevational view of an alternative connector member incorporating a spring-loaded pivot member;

FIG. 17 is a schematic cross-section of the stall divider member having a square cross-sectional shape with a portion of the outer layer broken away for purposes of clarity;

FIG. 18 is a schematic cross-section of the stall divider member having a circular cross-sectional shape with a portion of the outer layer broken away for purposes of clarity;

FIG. 19 is a partially exploded schematic side perspective view of a mounting bracket positioned to receive a structural member of the stall divider to secure the stall divider to the framework of the barn;

FIG. 20 is a perspective view of the mounting bracket similar to that shown in FIG. 19, but with the structural member of the stall divider being engaged into the clamshells of the mounting bracket; and FIG. 21 is an upper schematic perspective view of the mounting bracket having received the structural member of the stall divider and secured the structural member with a fastener that draws the clamshells into a clamping arrangement.

DETAILED DESCRIPTION OF THE PREFERRED EMBODIMENT

Figure 1:
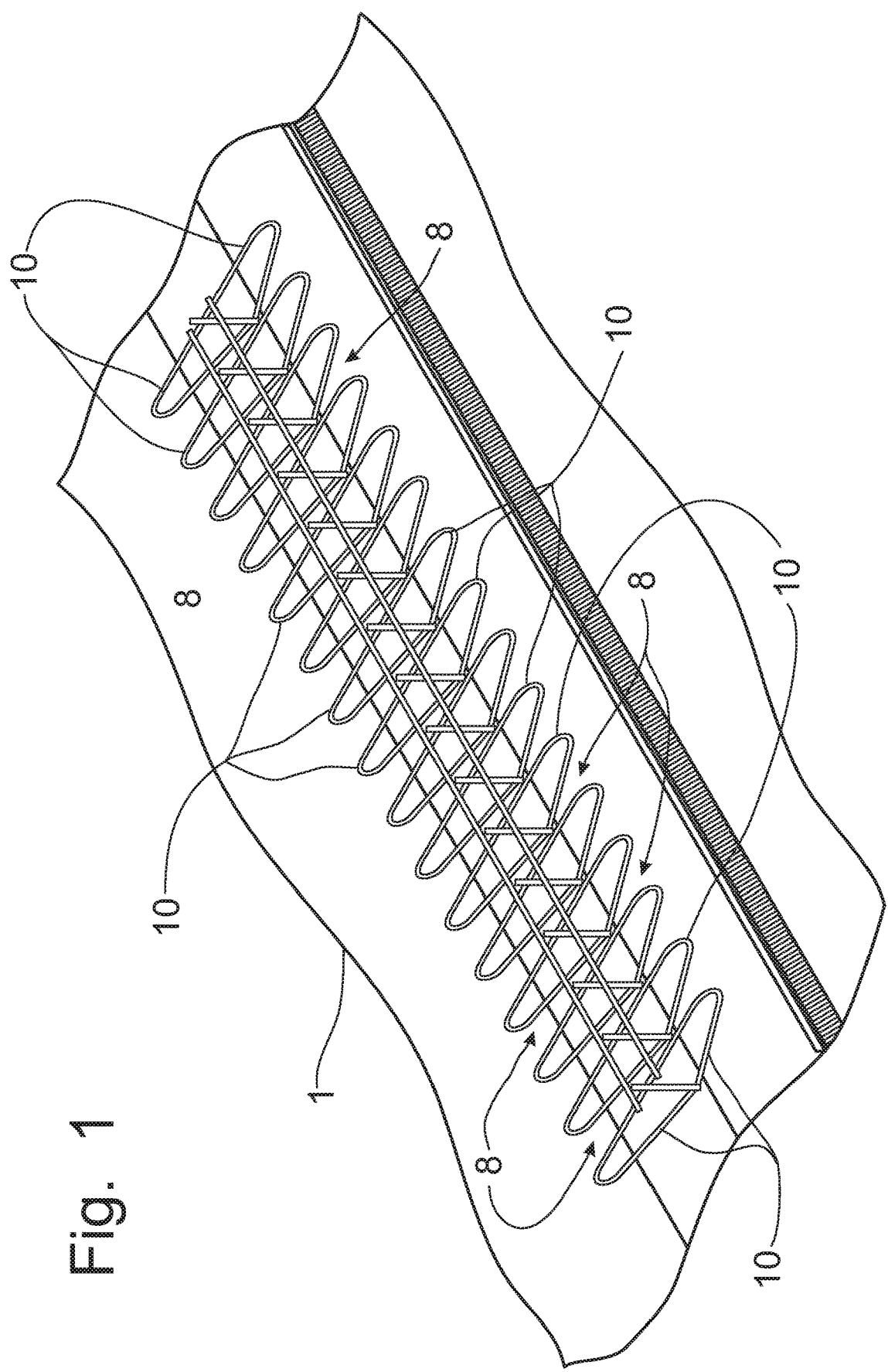
FIG. 1 is a schematic diagram of a portion of a free stall showing a plurality of parallel stall dividers incorporating the principles of the instant invention to define the respective stalls for the placement of cattle therein.
Figure 2:
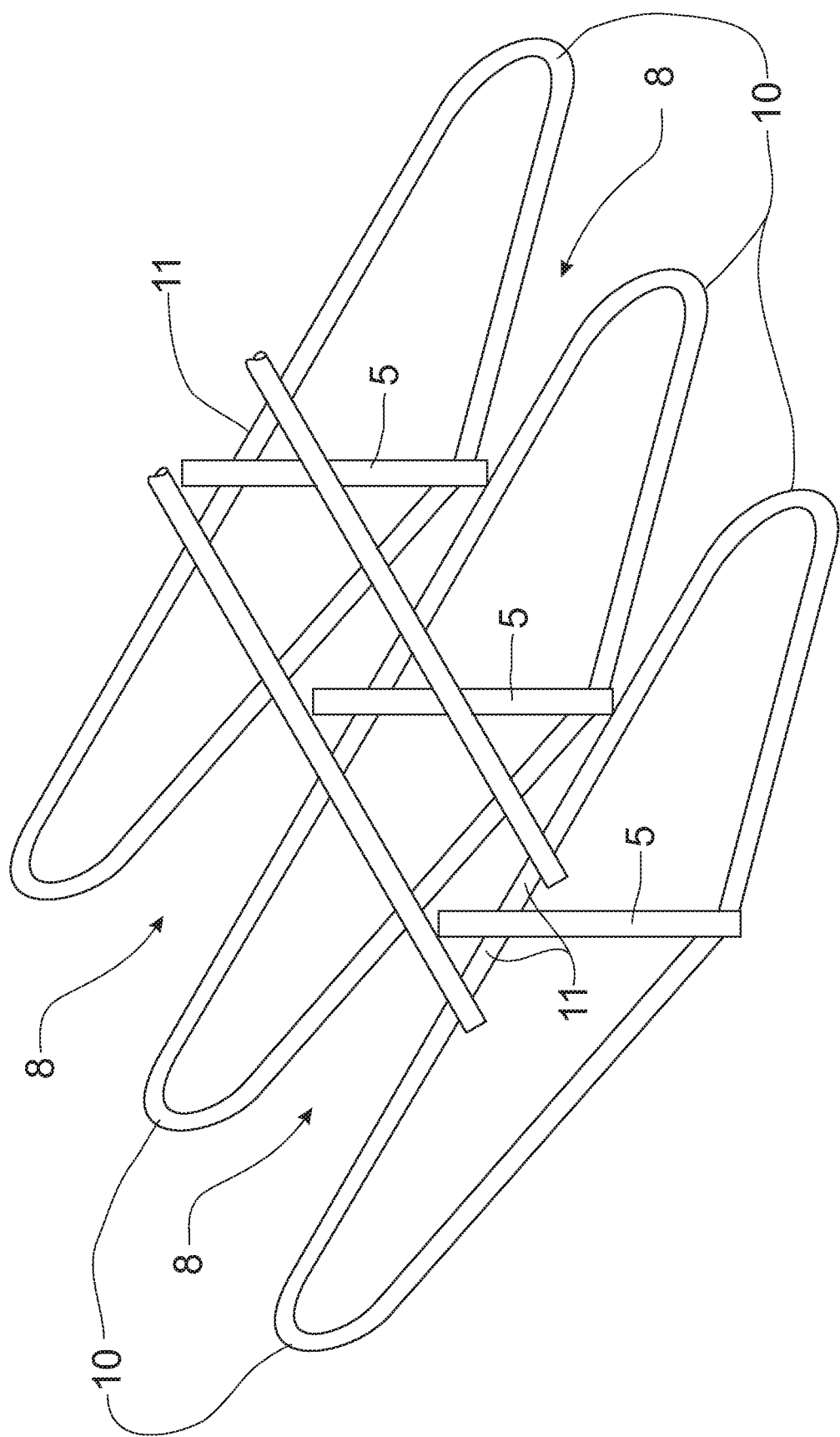
FIG. 2 is an enlarged schematic diagram of a portion of the free stall barn shown in FIG. 1.

Referring now to FIGS. 1-14, a stall divider for use in either tie stall or free stall barns configurations, incorporating the principles of the instant invention, can best be seen. One skilled in the art will understand that the principles of the instant invention are not limited to a particular shape or size of stall divider, nor to the specific polymer material used to manufacture the stall dividers.

Stall dividers 10 are mounted to support structure 5 at the base end 11 of the stall divider 10 in a parallel array to define stalls 8 therebetween. Cows entering the barn 1 find their way into a selected or designated stall 8 between opposing stall dividers 10. In tie stall barns, the cows are tied to a structural member (not shown) and then given feed and milked while within the stall. Cows in free stall barns are often released after they are finished eating and being milked so that they can find their way to a cool location to lie down. Alternatively, cows in tie stall barns are retained in the stalls for extended periods while tunnel ventilation is utilized to keep them comfortable. In free stall barns, the cows are simply allowed to enter a selected or designated stall where the cow is encouraged to lie down and be cooled by air currents flowing through the barn. In either configuration, cows will sometimes run into the stall dividers, which impact the sides of the cows and cause major or minor injury. Injuries are to be avoided to enhance milk production. Thus, when a cow impacts into a steel stall divider, injury is likely because steel dividers do not yield or give way to the cow.

By forming the stall dividers 10 from hollow flexible polymer tubing, the flexibility of the polymer tubing allows the stall divider 10 to flex laterally and minimize injury to the cow, while asserting a lateral force to the side of the cow to urge the cow into the proper location between the stall dividers 10. This flexible polymer can be one of several plastic materials, including polypropylene, polyurethane and polyethylene. Each of these polymer materials can be formed in different densities, where the higher the density of the polymer, the less flexible the polymer is. For the purposes of manufacturing stall dividers, each of these materials comes in a high density (HD), medium density (MD) and low density (LD) configurations. High density material would have a density in the range of 0.941 to 0.955 g/cc, while medium density material would have a density in the range of 0.926 to 0.940 g/cc and low density material would have a density in the range of 0.010 to 0.925 g/cc.

All three density configurations can be utilized in the manufacture of an improved stall divider configuration, as will be described in greater detail below. In the monolithic stall divider configuration depicted in FIG. 4, the entire stall divider 10, including the upper or first horizontal member 15, the lower or second horizontal member 17 and the curved end member 19 are all formed from the same material and same density. Preferably, the medium density polymer is utilized to provide both durability and flexibility when impacted by a cow. Alternatively, the high density configuration can be used, which would enhance durability at the expense of flexibility in the stall divider 10. The stall divider 10 of FIG. 4 will flex laterally to either direction and then the stall divider will try to return to the original position, even asserting a force against the cow, as the shape retention memory of the polymer material urges the stall divider 10 back to its original formed orientation.

Figure 14:
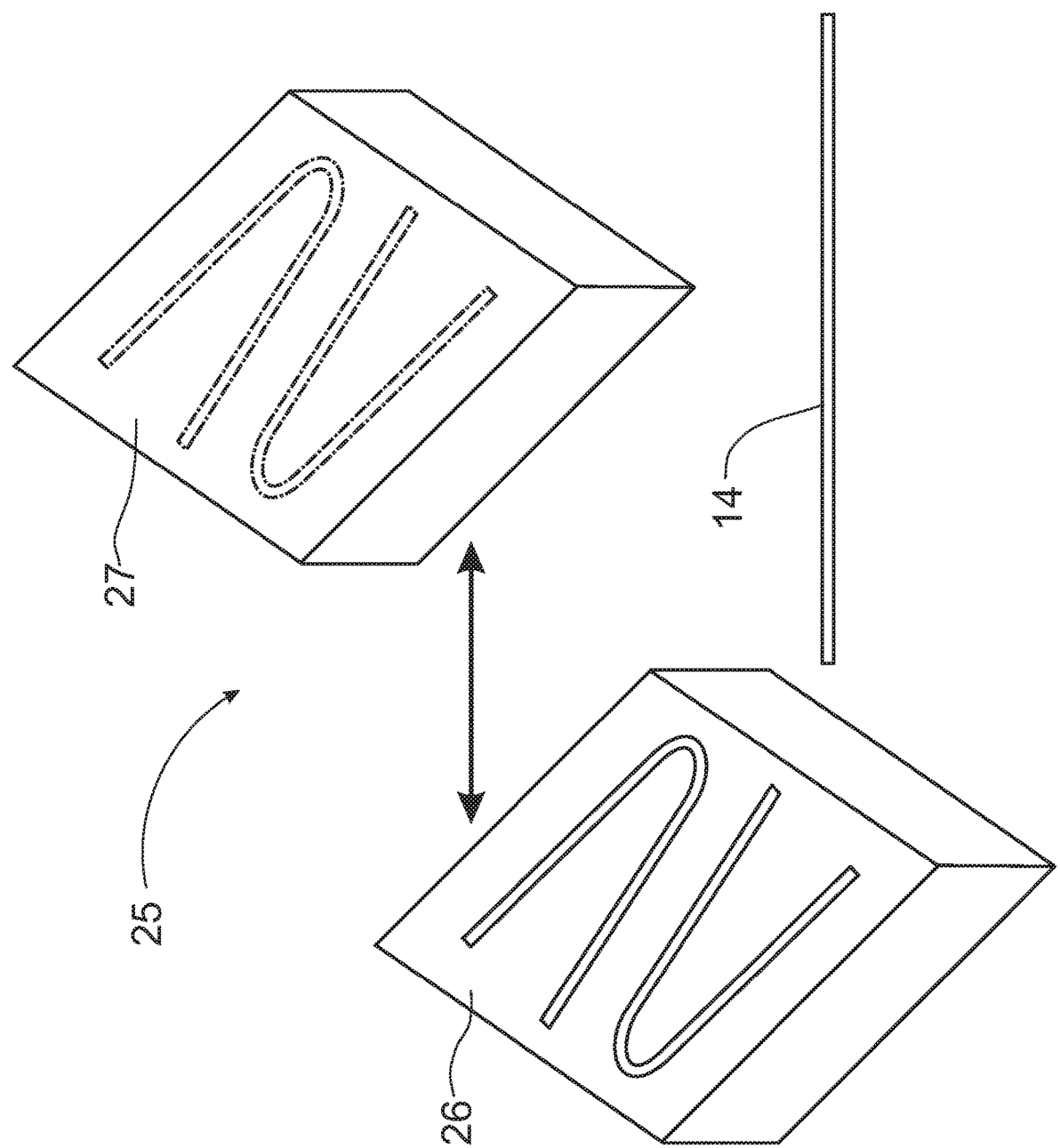
FIG. 14 is a schematic representation of a mold for shaping a formed line blank into the desired stall divider configuration.

The manner in which this monolithic stall divider 10 of FIG. 4 can be manufactured is by softening through heating a selected length of hollow tubing formed from a flexible polymer so that the length of hollow tubing, i.e. a line blank 14, can be placed into a form 25, as depicted in FIG. 14, and shaped into the desired stall divider shape. This selected length of hollow polymer tubing is preferably formed of high or medium density polyethylene and being two to three inches in diameter with wall thickness of 0.10 to 0.60 inches, although other configurations of hollow polymer tubing is also effective. The selected length is chosen to fill the die 26 from one end to the other, after which the mating half of the die 27 is secured so that the stall divider is maintained in the proper shape and then cooled. Alternatively, the stall divider member can be formed through rotational molding techniques by which a form in the shape of the stall divider member is created; the polymer is heated and then rotated to create a uniform distribution of the plastic material throughout the mold to manufacture a hollow polymer stall divider member.

Figure 3:
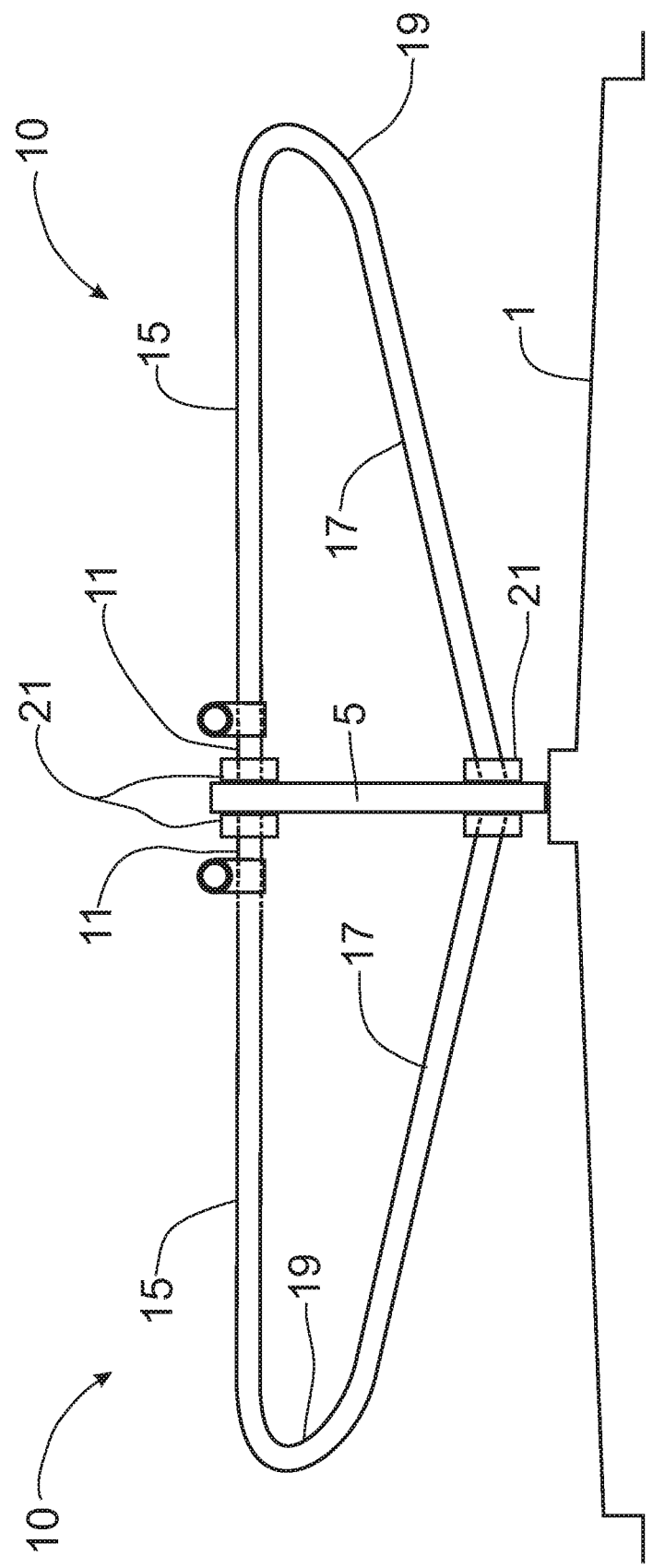
FIG. 3 is a side elevational view of the free stall configuration shown in FIG. 2.
Figure 8:
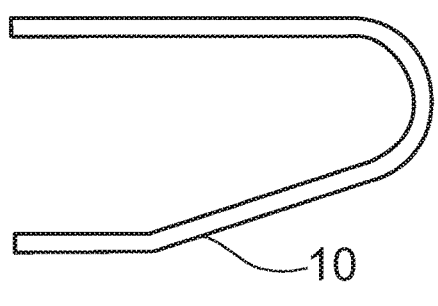
FIGS. 8-13 are side elevational view of various configurations of stall dividers that can be constructed in accordance with the principles of the instant invention.
Figure 11:
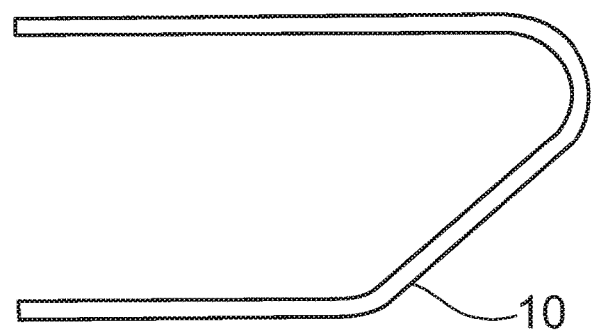
Figure 9:
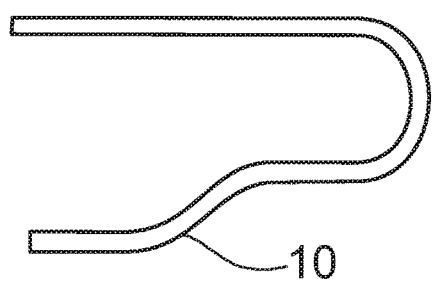
Figure 12:
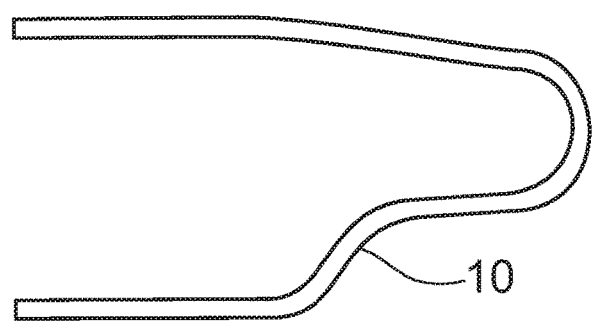
Figure 10:
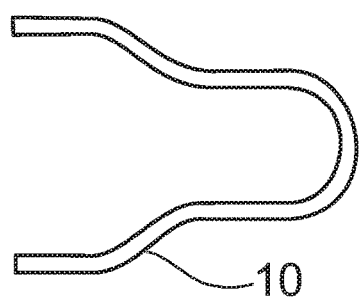
Figure 13:
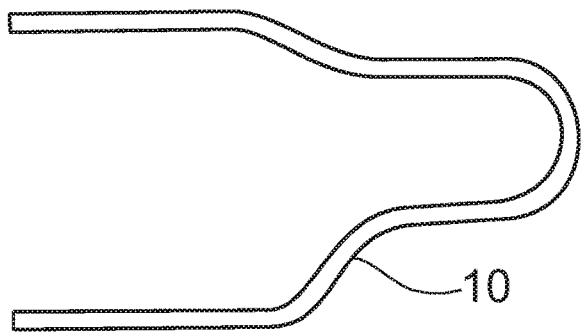

As is depicted in FIG. 3, the stall divider 10 is preferably connected to the support structure 5, which can be a metal, steel riser, or the structure 5 may also be formed of polymer tubing, by connecting brackets 21 supported on the structure 5 and preferably connected to the elongated members 15, 17 by fasteners (not shown). Thus, the base ends 11 of the upper and lower elongated members are secured to the support structure 5 and extend outwardly therefrom in a cantilevered manner. With an impact from a cow moving into the stall 8, the polymer stall divider 10 will bend laterally while the base ends 11 remain secured to the support structure 5.

The above-described method of forming the stall divider 10 from polymeric material by heating the polymer tubing until soft enough to bend into shape within the die can also be utilized to create multi-density stall dividers 10. As shown in FIGS. 5 and 6, the curved end member 19 can be formed from a polymer that has a lower density that the remaining portions of the stall divider 10. In this manner, the curved end member 19 will have a greater degree of flexibility than the rest of the stall divider structure 15, 17. As depicted in FIG. 6, the upper and/or lower elongated members 15, 17 can also be formed from the polymer material having different densities to enhance the flexibility and bending capability of the stall divider 10 when impacted by a cow.

Looking first at FIG. 6, the base end 11 can be formed of a high density polymer to provide a somewhat rigid mounting structure for connecting to the riser 5, but the distal portion 12 of the elongated members can be formed from a medium density form of the polymer to enhance flexibility in the elongated members 15, 17, and then the curved end members 19 can be formed from a low density version of the polymer material to further minimize the possibility of injury to a cow impacting the end of the stall divider 10. Alternatively, as depicted in FIG. 5, the entire elongated members 15, 17 can be formed from a high or medium density polymer, while the curved end member 19 is formed from a lower density version of the polymer than the elongated member 15, 17. Preferably, the same polymeric material is used throughout the stall divider 10 structure, with only the density changing from one portion to the other. However, different polymer materials can be used from one section to the other to maximize the desirable properties of the stall divider 10, as long as the respective sections of polymer can be joined together in some manner to create an integral stall divider structure.

The respective sections of the stall divider 10 can be combined to create a line blank 14 by selecting appropriate lengths of the respective densities of polymeric tubing material and plastic welding the tubing together to create the line blank 14. The line blank 14 is then heated, as previously noted, until soft enough to shape into the die 26 to form the desired stall divider configuration. Accordingly, in the embodiment shown in FIG. 5, a first length of a first density polymer tubing corresponding to the linear length of the upper elongated member 15 is plastic welded to the end of a second length of a second density polymer tubing corresponding to the linear length of the curved end member 19. The remaining end of the second length of polymer tubing is then plastic welded to a third length of the first density polymer tubing corresponding to the length of the lower elongated member 17 to form the line blank 14. Once heated, the softened line blank 14 can be inserted into the die 26 into the shape of the desired stall divider 10 and covered by the mating die 27 until cooled and extracted.

Similarly, the line blank 14 for the configuration depicted in FIG. 6 can also be formed starting with a first length of a high density polymer tubing plastic welded to the end of a second length of a medium density polymer tubing, which is then plastic welded to a third length of low density polymer tubing. A fourth length of medium density polymer tubing is then welded to the free end of the third length, followed by a fifth length of high density polymer tubing plastic welded to the free end of the fourth length. The multi-density line blank 14 is then ready for heating and shaping into the desired stall divider configuration.

FIG. 7 depicts a connector member 30 that can be used to connect respective lengths of polymer tubing in the formation of the line blank 14. The connector member 30 is shaped and sized to fit into the hollow opening extending through the respective tubing members with a central portion 32 having an external diameter equal to the diameter of the polymer tubing. Thus, when the connector member 30 is inserted to connect two lengths of polymer tubing, the exterior surface looks substantially seamless. Preferably, the connector member 30 is secured to the opposing lengths of tubing with adhesives that are heat resistant and allow the formation of the line blank 14 into the die 26.

The connector member 30 is preferably a low density type of the same polymeric material from which the opposing lengths of tubing 11, 12 are constructed; however, the connector member could be formed from a more flexible material like rubber or a more rigid material such as steel, depending on the intended function of the connector member 30. As an alternative, the tubing members can be standard steel tubing with the connector members 30 providing some flexibility in the lateral movement of the stall divider. Also, the tubing could be formed from a polymer material, as noted above, with the connector member being a rigid steel member interconnecting the respective sections of polymer tubing. Instead of plastic welding, the respective sections of the line blank 14 formed of different densities of polymer tubing can be joined together by adhesives securing the connector member 30 to the respective lengths of tubing 11, 12.

Referring now to FIGS. 15-17, an alternative construction for the stall divider 10 can best be seen. Looking first at FIGS. 17 and 18, the structural configuration of the stall divider is of a steel tube or pipe 41 inserted inside a correspondingly shaped polymer sleeve, such as a high density polyethylene (HDPE) tube or pipe 43, which is then bent into the appropriate shape, such as is shown in FIGS. 6-13, with a curved portion 39 extending between an linear upper portion 36 and a linear lower portion 37, or just a shaped curved portion 39. Preferably, the construction starts with an appropriately long section of HDPE pipe 43 having an inside diameter that is slightly larger than the outer diameter of a correspondingly shaped steel tube or pipe 41 and the steel pipe 41 is placed into the HDPE pipe 45. The steel/HDPE composite member 45 is then bent into the desired shape. Alternatively, the HDPE material can be molded onto the outer surface of the steel tubing 41 to create the composite steel/HDPE member 45 that can then be bent into desired shape. During the bending of the composite member 45, the HDPE may require heating to raise the temperature thereof to be more flexible during the bending process to prevent the HDPE material from cracking or splitting apart.

As seen in FIGS. 15 and 16, representing two differently shaped stall divider members 30, the stall divider 30 includes a shaped, i.e. bent, member 35 and short upper and lower mounting members 31 and 38 mounted onto the central support structure 5 by the connecting members 21. As one of ordinary skill in the art will recognize, the steel or composite steel/HDPE stall divider members 30 are rigid. To provide some flexibility for the stall divider member 30, a flexible connector 32 receives the respective ends of the formed member 35 and the straight mounting members 31 and 38, respectively, to interconnect the formed member 35 and the mounting members 31, 38 and allow deflection of the formed member at the flexible connector 32. The flexible connector 32 can be formed of rubber and be received externally on or internally of the formed member 35 and the respective mounting members 31, 38. Alternatively, the flexible coupling member 32 can be a spring that is stiff enough to support the formed member 35 from the mounting members 31, 38, yet capable of bending to allow the formed member 35 to deflect when engaged by a cow or other animal.

Another alternative configuration for the flexible connector 32 is shown in FIG. 16A in which the flexible connectors 32 are formed of a rigid material, such as steel and incorporates a central pivot 32c or hinge that is spring-loaded to a central position corresponding to the normal orientation parallel to all other stall dividers. The opposing sides 32a, 32b of the flexible connector 32 are secured to the mounting members 31, 38 and the formed member 35, as noted above, which can be formed from steel, a composite steel/HDPE or just a polymer material, wherein the pivot 32c in the flexible connector 32 provides the ability to deflect when the animal moves against the stall divider 30, yet the spring, preferably a torsion spring, will return the stall divider to a normal orientation when the animal moves away from the stall divider 30. The central pivot or hinge 32c can incorporate internal stops (not shown) that can provide a maximum amount of relative deflection between the opposing sides of the flexible connector 32 while allowing pivotal movement or deflection of the stall divider components in both opposing lateral directions. By utilizing flexible connectors 32 incorporating a spring-loaded pivot mechanism 32c in multiple selected locations, such as is demonstrated for example in the right side of FIG. 16, even steel tubing stall dividers 10 can provide desired flexibility characteristics.

One of ordinary skill in the art will recognize that the steel/HDPE composite member 45 formed into a stall divider 30 without benefit of a flexible coupling member 32 also provides an improvement in the formation of stall dividers for either free stall or tie stall barns. The inner steel tubing 41 provides a durable and rigid support in the stall divider, while the HDPE tubing 43 on the outside provides a more comfortable, yet durable, surface against which animals can rest against. The inner steel tubing 41 can be formed from standard steel pipe, or as galvanized or stainless steel pipe. In the event a section of the HDPE material 43 wears down to the inner steel pipe 41 core, the HDPE material 43, particularly if the HDPE material is a pipe member into which the steel tubing has been inserted, can be cut away from the steel inner core 41 and replaced with an appropriate section of HDPE tubing. The replacement HDPE tubing can be plastic welded to the remaining portions of the HDPE material 43 to refurbish the stall divider 30 without removing the stall divider 30 from the barn.

The location of the flexible coupling members 32 is not limited to being in close proximity to the central support structure 5. The flexible coupling members 32 can be positioned along the length of the stall divider 30 to provide the deflection characteristics that are desired. Multiple flexible coupling members 32 can be inserted along the length of the stall divider 30, as is reflected in the right side of FIG. 16 by dividing the formed member 39 into three pieces, in order to provide still different deflection characteristics. In such a configuration, the flexible coupling members 32 proximate the central support structure 5 could have a different stiffness, or flexibility, than the flexible coupling members 32 spaced away from the central support structure 5 to provide still different deflection characteristics. One skilled in the art will recognize that the stall dividers 30 could be formed without the use of flexible coupling members 32, which would create a stall divider 30 with a conventional lack of flexibility, while the polymer pipe provides a small measure of yield when a cow presses against the stall divider and results in a more comfortable stall divider 30.

Stall dividers 30 constructed as defined above, particularly with the insertion of flexible coupling members 32, will provide stall dividers 30 with better comfort and less injury for the cows, which in turn can allow the cows to live a longer productive life, provide more milk, thus providing greater profitability for the owner. As yet another alternative configuration, the curved end member 39 can be formed from flexible vacuum suction line operable at 1100 psi, and provide the desired flexible characteristics for the end portion of the stall divider 10.

Referring now to FIGS. 19-21, an improved mounting bracket 50 for mounting the stall dividers 30 to the central support 5 for the barn in which the stall dividers 30 are to be deployed can best be seen. The mounting bracket 50 is formed with a pair of opposing semi-circular clam shell members 52, 53 welded to a base plate 51. The clam shell members 52, 53 are separated by a gap 54 but collectively define a circular opening having a diameter of a size that will receive the mounting member 31, 38 internally thereof. The base plate 51 has a series of apertures above and below the welded connection of the clam shell members 52, 53 to the base plate 51 which enable the base plate to be secured to a wood frame or a conventional metal frame with lag screws or connecting bolts (not shown). In some mounting configurations, the upper set of apertures can be used to connect to a frame member while the lower set of apertures can be used to permit the passage of fasteners that interconnect with a corresponding base plate 51 for an opposing stall divider 30.

As depicted in FIGS. 19-21, the mounting member 31, 38 is slid into the opening defined between the clam shell members 52, 53 and positioned appropriately within the mounting bracket 50 to provide the desired location of the stall divider 10. An opening through the mounting member 31, 38 is then drilled through the mounting member 31, 38 in alignment with the opening 55 in the opposing clam shell members 52, 53. A fastener 56 is then inserted through the aligned openings 55 and in the mounting member 31, 38 and secured with a lock nut. The tightening of the lock nut on the fastener 56 draws the clam shell members 52, 53 together, as is depicted in FIG. 21, reducing the gap 54 between the clam shell members 52, 53 at the distal end of the mounting bracket 50 to provide a clamping force on the mounting member 31, 38 to help retain the mounting member 31, 38 within the mounting bracket 50 in addition to the fastener 56.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A stall divider, comprising:
a first generally horizontal, elongated member;
a second generally horizontal, elongated member being oriented in a vertical plane with said first elongated member;
a curved member interconnecting said first and second elongated members to form said stall divider for mounting on a central support structure;
each of said first elongated member, said second elongated member and said curved member being a formed composite member having a rigid metallic inner member and a polymeric outer member, each said formed composite member being bent into a desired shape for mounting on said central support structure to provide a structural member between stalls in a barn; and
a first flexible coupling member placed between said first elongated member and the corresponding said mounting bracket and a second flexible coupling member placed between said second elongated member and the corresponding said mounting bracket, said first and second flexible coupling members being vertically aligned within said vertical plane to define a vertical pivot axis that permits only a lateral deflection of said stall divider relative to said mounting brackets.

2. The stall divider of claim 1 wherein said formed composite member has a circular cross-sectional shape.

3. The stall divider of claim 1 wherein said formed composite member has a rectangular composite shape.

4. The stall divider of claim 1 wherein said rigid metallic inner member is a steel pipe having an outer diameter and said polymeric outer member is a high density polyethylene pipe having an inner diameter larger than the outer diameter of said steel pipe, said steel pipe being inserted into the high density polyethylene pipe to create said composite member.

5. The stall divider of claim 4 wherein said steel pipe and said high density polyethylene pipe are formed into linear sections before the steel pipe is inserted into the high density polyethylene pipe, and then bent into said desired shape.

6. The stall divider of claim 1 wherein said formed composite member includes a first formed divider member and a pair of mounting members connected to said central support structure, said stall divider further comprising a flexible coupling member interconnecting said formed divider member with each of said mounting members.

7. The stall divider of claim 6 wherein said flexible coupling members permit deflection of said formed divider member relative to said mounting members.

8. The stall divider of claim 7 wherein said flexible coupling members are formed of an elastomeric material.

9. The stall divider of claim 7 wherein said flexible coupling members incorporate a pivot that is biased into a neutral orientation by a spring.

10. A stall divider, comprising:
a first generally horizontal, elongated member;
a second generally horizontal, elongated member being oriented in a vertical plan with said first elongated member;
a curved member interconnecting said first and second elongated members to form said stall divider for mounting on a central support structure;

a pair of mounting members for mounting on said central support structure;

each of said first elongated member, said second elongated member and said curved member being a formed polymeric member bent into a desired shape; and a first flexible coupling member interconnecting said first elongated member and the corresponding said mounting member and a second flexible coupling member interconnecting said second elongated member and the mounting member corresponding hereto, said first and second flexible couplings being vertically aligned within said vertical plane to define a vertical pivot axis that permits said first and second elongated members to only deflect laterally relative to said mounting members.

11. The stall divider of claim 10 wherein said first member is divided into three formed pieces with a second pair of flexible coupling members interconnecting the three formed pieces of said first member.

12. The stall divider of claim 10 wherein said flexible coupling members are formed of an elastomeric material.

13. The stall divider of claim 10 wherein said flexible coupling members are formed with a pivot member that is biased into a normal orientation by a spring.

14. The stall divider of claim 10 further comprising a pair of mounting brackets supported from said central support structure and being positioned to receive said mounting members, each said mounting bracket comprising:

a base plate; and a pair of clam shell members affixed to said base plate and projecting perpendicularly thereto to define a gap between said clam shell members and an opening between said clam shell members to receive one of said mounting members.

15. The stall divider of claim 14 wherein said clam shell members are formed with aligned transverse openings therein for the passage of a fastener through said claim shell members and the mounting member received in said opening between said clam shell members, the tightening of said fastener drawing said clam shell members together to place a clamping force onto said mounting member.

16. A stall divider, comprising:

a first generally horizontal, elongated member;

a second generally horizontal, elongated member being oriented in a vertical plane with said first elongated member;

a curved member interconnecting said first and second elongated members to form said stall divider for mounting on a central support structure;

mounting brackets engaged with said first and second elongated members and connected to said central support structure; and a first flexible coupling placed between said first elongated member and the corresponding said mounting bracket and a second flexible coupling placed between said second elongated member and the corresponding said mounting bracket, said first and second flexible couplings being vertically aligned within said vertical plane to define a vertical pivot axis that permits only a lateral deflection of said stall divider relative to said mounting brackets.

17. The stall divider of claim 16 wherein said flexible couplings are formed only from an elastomeric material.

18. The stall divider of claim 16 wherein said flexible couplings are formed from a rigid material and incorporate a spring-loaded pivot mechanism to define said vertical pivot axis and permit lateral deflection of said stall divider relative to said mounting brackets.

19. The stall divider of claim 16 wherein said mounting brackets comprise:

a base plate; and a pair of clam shell members affixed to said base plate and projecting perpendicularly thereto to define a gap between said clam shell members and an opening between said clam shell members to receive one of a mounting member associated with the corresponding first and second elongated members.

20. The stall divider of claim 19 wherein said clam shell members are formed with aligned transverse openings therein for the passage of a fastener through said claim shell members and the mounting member received in said opening between said clam shell members, the tightening of said fastener drawing said clam shell members together to place a clamping force onto said mounting member.

21. The stall divider of claim 16 wherein said first and second elongated members and said curved member are formed from steel tubing having a high density polyethylene material molded on the outer surface of said steel tubing.

* * * * *